United States Patent
Matsuo et al.

(10) Patent No.: US 10,894,470 B2
(45) Date of Patent: Jan. 19, 2021

(54) VEHICLE BATTERY-CARRYING FLOOR STRUCTURE

(71) Applicant: Toyota Jidosha Kabushiki Kaisha, Toyota (JP)

(72) Inventors: Yasuhide Matsuo, Toyota (JP); Ayaka Kagami, Inazawa (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 16/448,600

(22) Filed: Jun. 21, 2019

(65) Prior Publication Data
US 2020/0031214 A1    Jan. 30, 2020

(30) Foreign Application Priority Data
Jul. 25, 2018  (JP) ................................ 2018-139351

(51) Int. Cl.
*B60K 1/04* (2019.01)
*B60L 50/60* (2019.01)

(52) U.S. Cl.
CPC ................ *B60K 1/04* (2013.01); *B60L 50/66* (2019.02); *B60K 2001/0438* (2013.01)

(58) Field of Classification Search
CPC .... B60K 1/04; B60K 2001/0438; B60L 50/66
See application file for complete search history.

(56) References Cited

U.S. PATENT DOCUMENTS

| 10,483,510 B2* | 11/2019 | Stephens | B60L 50/64 |
| 10,661,646 B2* | 5/2020 | Matecki | B60L 50/66 |
| 2012/0161472 A1 | 6/2012 | Rawlinson et al. | |
| 2018/0105062 A1* | 4/2018 | Fees | B60L 50/66 |
| 2019/0100090 A1* | 4/2019 | Matecki | B60L 50/66 |
| 2019/0255929 A1* | 8/2019 | Nagano | B60L 50/64 |
| 2020/0180443 A1* | 6/2020 | Frost | B60L 50/64 |

FOREIGN PATENT DOCUMENTS

| DE | 102016213832 A1 | 2/2018 |
| EP | 3345779 A1 | 7/2018 |
| GB | 2541203 A | 2/2017 |
| JP | 5372128 B2 | 12/2013 |

* cited by examiner

*Primary Examiner* — Brian L Swenson
(74) *Attorney, Agent, or Firm* — Dinsmore & Shohl LLP

(57) ABSTRACT

A vehicle battery-carrying floor structure that includes: a bottom plate member that has a plurality of unit members that are arranged in a vehicle body forward and rearward direction and that are joined by joining opposing joint portions, each unit member having a flat plate portion that extends in a vehicle width direction and that has the joint portions formed at an end portion facing the vehicle body forward direction and at an end portion facing the vehicle body rear direction and a partition portion that is disposed upright so as to extend in the vehicle width direction on an upper surface of the plate portion; and side plate members that are provided on an upper surface of the bottom plate member on outer sides in the vehicle width direction of the partition portions and form, with the partition portions, regions that hold battery packs.

10 Claims, 13 Drawing Sheets

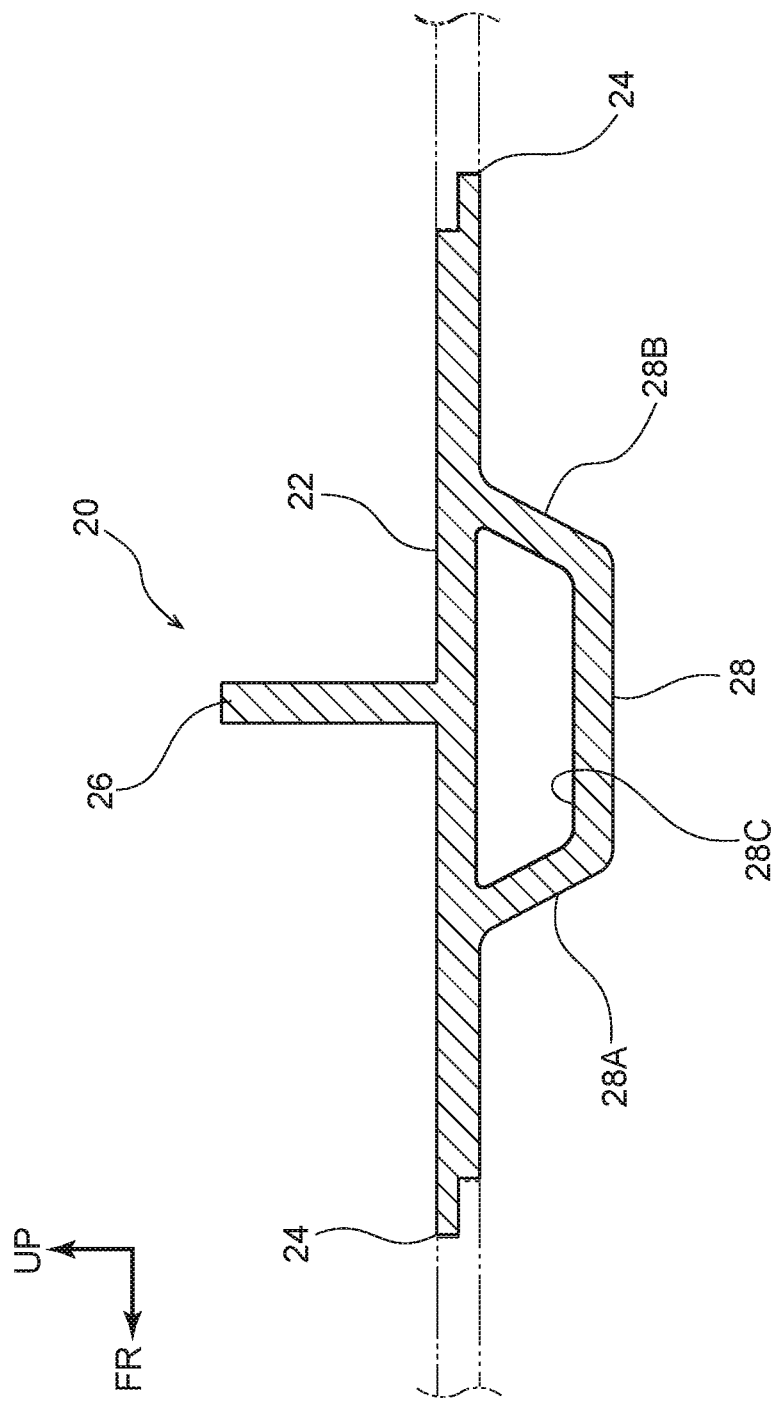

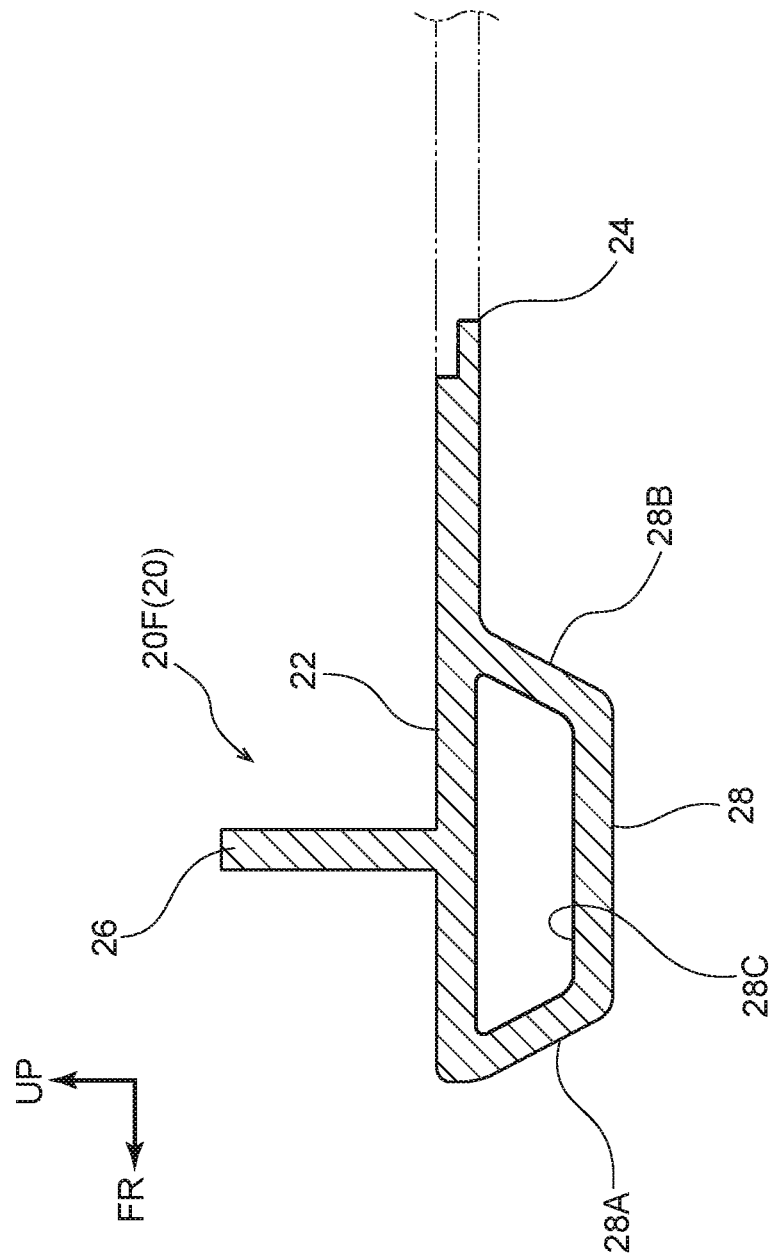

VEHICLE BATTERY-CARRYING FLOOR STRUCTURE

CROSS-REFERENCE TO RELATED APPLICATION

This application is based on and claims priority under 35 USC 119 from Japanese Patent Application No. 2018-139351 filed on Jul. 25, 2018, the disclosure of which is incorporated by reference herein.

BACKGROUND

Technical Field

The present disclosure relates to a vehicle battery-carrying floor structure.

Related Art

A structure is known where side members are joined by welding to the top of a peripheral edge portion of a bottom plate and where plural cross members that extend in a vehicle width direction are joined by welding to, so as to be arranged side by side in a vehicle body forward and rearward direction on, the bottom plate, with battery packs being put between the cross members on the bottom plate (e.g., see Japanese Patent No. 5,372,128).

However, in this kind of structure, the number of battery packs that the structure holds is undifferentiated, so increases and decreases in the number of battery packs cannot be accommodated. In other words, this kind of structure has little flexibility with respect to the battery pack carrying capacity.

SUMMARY

An aspect of the disclosure is a vehicle battery-carrying floor structure that includes: a bottom plate member that has a plurality of unit members that are arranged in a vehicle body forward and rearward direction and that are joined by joining opposing joint portions, each unit member having a flat plate portion that extends in a vehicle width direction and that has the joint portions formed at an end portion facing the vehicle body forward direction and at an end portion facing the vehicle body rear direction and a partition portion that is disposed upright so as to extend in the vehicle width direction on an upper surface of the plate portion; and side plate members that are provided on an upper surface of the bottom plate member on outer sides in the vehicle width direction of the partition portions and form, with the partition portions, regions that hold battery packs.

BRIEF DESCRIPTION OF DRAWINGS

FIG. 3 is a sectional view, along line 3-3 of FIG. 1, showing a unit member of the vehicle battery-carrying floor structure pertaining to the embodiment;

FIG. 4 is a sectional view, along line 4-4 of FIG. 1, showing a unit member of the vehicle battery-carrying floor structure pertaining to the embodiment;

DETAILED DESCRIPTION

Figure 1:
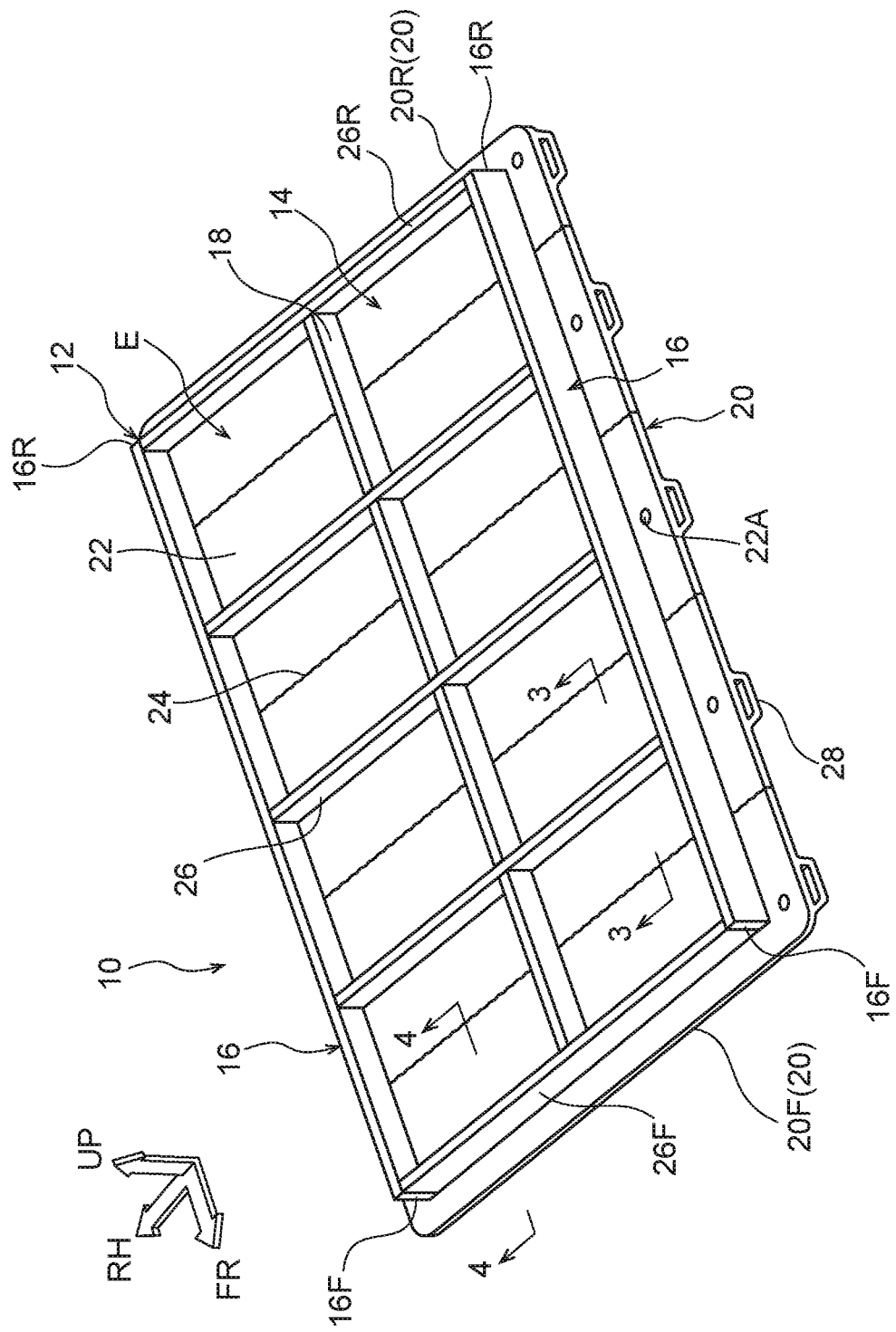
FIG. 1 is a perspective view showing a vehicle battery-carrying floor structure pertaining to an embodiment.

An embodiment pertaining to the disclosure will be described in detail below on the basis of the drawings. It will be noted that for convenience of description, arrow UP appropriately shown in the drawings indicates a vehicle body upward direction, arrow FR indicates a vehicle body forward direction, and arrow RH indicates a vehicle body rightward direction. Consequently, when in the following description the directions of upper/lower, front/rear, and right/left are used without further specification, these will be understood to mean upper/lower in the vehicle body upward and downward direction, front/rear in the vehicle body forward and rearward direction, and right/left in the vehicle body rightward and leftward direction (the vehicle width direction).

Figure 2:
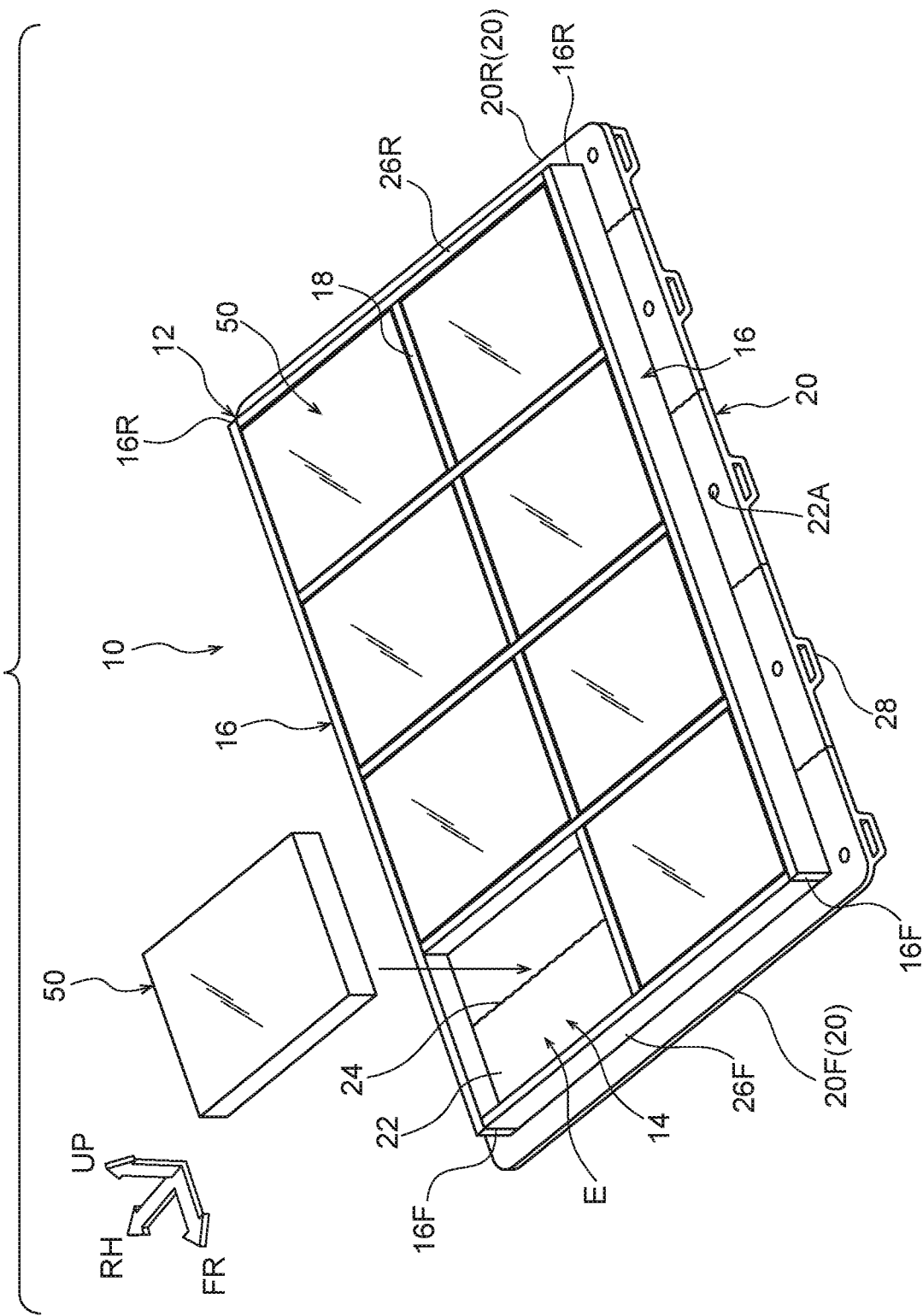
FIG. 2 is a perspective view showing, together with battery packs, the vehicle battery-carrying floor structure pertaining to the embodiment.

As shown in FIG. 1 and FIG. 2, a vehicle battery-carrying floor structure 10 pertaining to the embodiment is configured by a battery case 12 that holds plural battery packs 50. The battery case 12 is configured to include plural unit members 20 that are coupled to each other in the vehicle body forward and rearward direction. It will be noted that the unit members 20 are formed by extruding a light metal material such as an aluminum alloy.

As shown in FIG. 1 to FIG. 4, the unit members 20 each have a rectangular flat plate-shaped flat plate portion 22, which extends in the vehicle width direction and has a joint portion 24 formed in its end portion facing the vehicle body forward direction and in its end portion facing the vehicle body rearward direction, and a rectangular flat plate-shaped partition portion 26, which is integrally disposed upright, so as to extend in the vehicle width direction, on an upper surface, and in the vehicle body forward and rearward direction center portion, of the flat plate portion 22. Additionally, the unit members 20 each have a reinforcement portion 28 that is integrally formed on a lower surface of the flat plate portion 22 on the opposite side of the partition portion 26.

It will be noted that a unit member 20F (see FIG. 1 and FIG. 2) provided on the front end portion is, as shown in FIG. 4, configured with the part of the flat plate portion 22 on the vehicle body front side of the reinforcement portion 28 being cut off, so that a joint portion 24 is formed in only the rear end portion of the flat plate portion 22. Likewise, a unit member 20R (see FIG. 1 and FIG. 2) provided on the rear end portion is configured with the part of the flat plate portion 22 on the vehicle body rear side of the reinforcement portion 28 being cut off, so that a joint portion 24 is formed in only the front end portion of the flat plate portion 22.

As shown in FIG. 3 and FIG. 4, the joint portions 24 are formed stepwise (stepped), and the joint portions 24 on the vehicle body front side and the vehicle body rear side of each unit member 20 are formed vertically symmetrical. That is, the joint portion 24 on the vehicle body front side of each unit member 20 is formed in such a way that its upper portion side (upper half) sticks out in the vehicle body forward direction, and the joint portion 24 on the vehicle body rear side of each unit member 20 is formed in such a way that its lower portion side (lower half) sticks out in the vehicle body rearward direction.

It will be noted that the arrangement of the unit members 20 may also be bilaterally reversed. In other words, the unit members 20 may also be arranged in such a way that the lower portion side (lower half) of the joint portion 24 on the vehicle body front side sticks out in the vehicle body forward direction and the upper portion side (upper half) of the joint portion 24 on the vehicle body rear side stick outs in the vehicle body rearward direction.

Additionally, the plural unit members 20 including the unit member 20F that configures the front end portion and the unit member 20R that configures the rear end portion are arranged side by side in the vehicle body forward and rearward direction and their mutually opposing joint portions 24 are engaged with and joined to each other in the upward and downward direction, thereby forming a bottom plate member 14 on which the battery packs 50 are placed. It will be noted that examples of the method for joining the joint portions 24 to each other include friction stir welding (FSW), but the method may also be arc welding or the like.

Figure 5A:
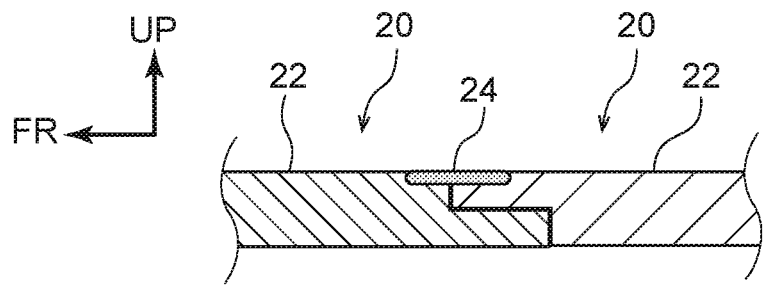
FIG. 5A is a side sectional view showing joint portions at upper surface sides of the unit members of the vehicle battery-carrying floor structure pertaining to the embodiment.
Figure 5B:
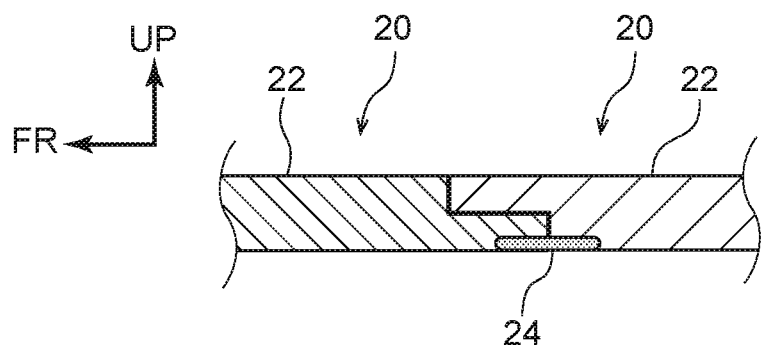
FIG. 5B is a side sectional view showing joint portions at lower surface sides of the unit members of the vehicle battery-carrying floor structure pertaining to the embodiment.
Figure 5C:
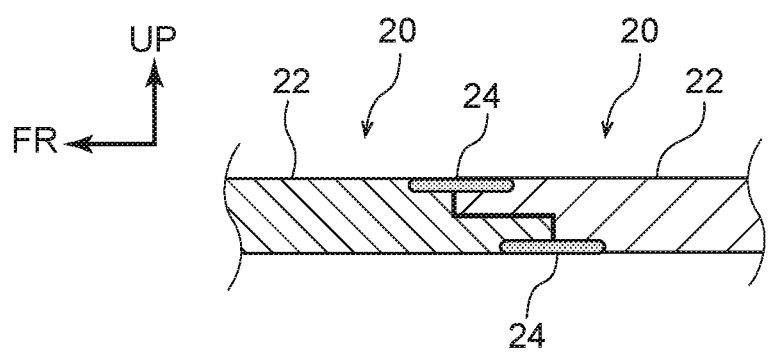
FIG. 5C is a side sectional view showing joint portions at upper surface sides and lower surface sides of the unit members of the vehicle battery-carrying floor structure pertaining to the embodiment.

The joint portions 24 may be joined to each other just at their upper surface sides (FIG. 5A) or may be joined to each other just at their lower surface sides (FIG. 5B). Moreover, the joint portions 24 may be joined to each other both at their upper surface sides and their lower surface sides (FIG. 5C). However, from the standpoint of inhibiting or preventing the ingress of muddy water and/or rain water, for example, at least the lower surface sides of the joint portions 24 may be joined to each other.

Figure 5D:
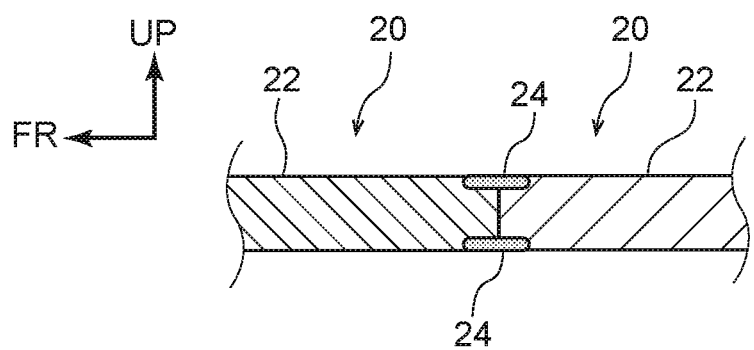
FIG. 5D is a side sectional view showing joint portions at upper surface sides and lower surface sides, in a non-stepwise manner, of the unit members of the vehicle battery-carrying floor structure pertaining to the embodiment.

Furthermore, the joint portions 24 are not limited to a configuration where they are formed stepwise (stepped). For example, as shown in FIG. 5D, the joint portions 24 may also be formed in shapes whose mutual end faces abut against each other in the vehicle body forward and rearward direction. In some embodiments, the joint portions 24 in this case may be joined to each other both at their upper surface sides and their lower surface sides as shown in FIG. 5D, and from the standpoint described above at least the lower surface sides of the joint portions 24 in this case may be joined to each other.

Furthermore, as shown in FIG. 1 and FIG. 2, the vehicle width direction outer end portions of the partition portions 26 of the unit members 20 have a predetermined length cut out from them. In other words, the length of the partition members 26 is configured to be shorter than the length of the flat plate portions 22. Additionally, a right and left pair of rectangular flat plate-shaped side plate members 16 that extend in the vehicle body forward and rearward direction are provided by joining such as welding, adhesion, or bolts on the upper surface of the bottom plate member 14 on the vehicle width direction outer sides of the partition portions 26.

It will be noted that at this time the inner surfaces of the side plate members 16 may be joined, or may not be joined, to the vehicle width direction outer end faces of the partition portions 26. In some embodiments, the front end faces 16F of the side plate members 16 may be flush with the front face of a partition portion 26F of the unit member 20F that configures the front end portion. In some embodiments, the rear end faces 16R of the side plate members 16 may also be flush with the rear face of a partition portion 26R of the unit member 20R that configures the rear end portion.

An outer frame of the battery case 12 is formed by the side plate members 16, the partition portion 26F of the unit member 20F that configures the front end portion, and the partition portion 26R of the unit member 20R that configures the rear end portion. Furthermore, the side plate members 16 are also formed of the same light metal material—such as an aluminum alloy—as the unit members 20.

Moreover, plural (e.g., four) rectangular flat plate-shaped intermediate plate members 18 that extend in the vehicle body forward and rearward direction are joined such as by welding, adhesion, or bolts on the upper surfaces, at the vehicle width direction center portions, of the flat plate portions 22. It will be noted that at this time the front end faces and the rear end faces of the intermediate plate members 18 may be joined, or may not be joined, to the rear faces and the front faces of the partition portions 26. Furthermore, the intermediate plate members 18 are also formed of the same light metal material—such as an aluminum alloy—as the unit members 20.

As shown in FIG. 2, plural (e.g., eight) battery packs 50, each formed in a substantially rectangular shape in plan view, are put substantially without any gap into plural (e.g., eight) regions (blocks) E, each substantially rectangular in shape as viewed in plan view, on the upper surface of the bottom plate member 14 and surrounded by the partition portions 26, the side plate members 16, and the intermediate plate members 18.

The battery case 12 in which the plural (e.g., eight) battery packs 50 are carried is formed by the bottom plate member 14, the side plate members 16, and the intermediate plate members 18. It will be noted that after the battery packs 50 have been put into the battery case 12, the battery case 12 is closed off by covering it with a rectangular flat plate-shaped cover member 48 (see FIG. 6). The cover member 48 is also formed of the same light metal material—such as an aluminum alloy—as the unit members 20.

Figure 6:
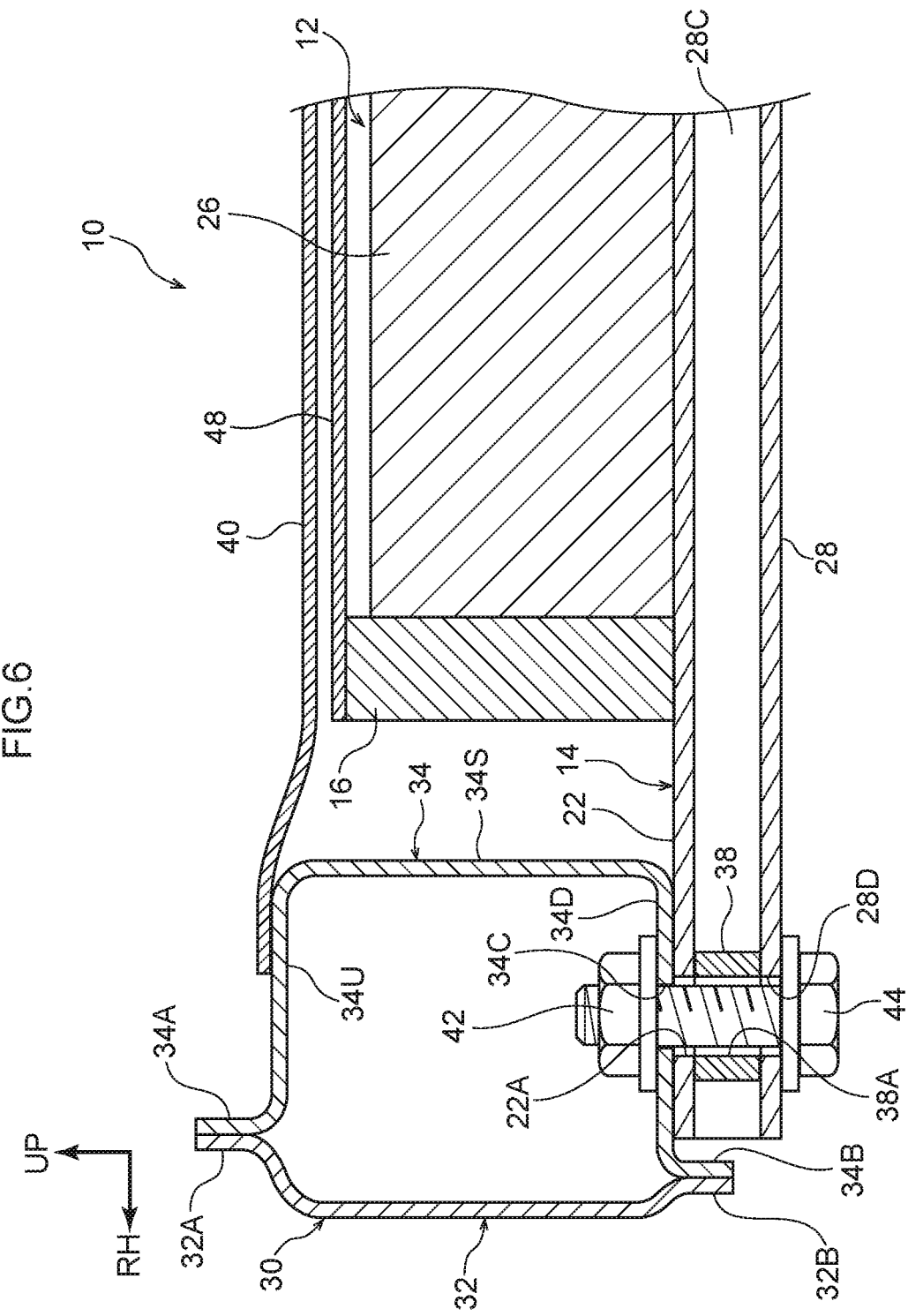
FIG. 6 is a front sectional view showing a state in which the vehicle battery-carrying floor structure pertaining to the embodiment is disposed on the lower side of a floor panel.

Furthermore, the heights of the partition portions 26, the side plate members 16, and the intermediate plate members 18 shown in FIG. 2 are configured to be identical, but they are not limited to this. For example, as shown in FIG. 6, the side plate members 16 may also be formed slightly higher than the partition portions 26 and the intermediate plate members 18. Furthermore, the heights of the partition portions 26, the side plate members 16, and the intermediate plate members 18 shown in FIG. 2 are configured to be identical to the height of the battery packs 50, but they are not limited to this. For example, the heights of the partition portions 26, the side plate members 16, and the intermediate plate members 18 may also be formed slightly higher than the height of the battery packs 50.

Furthermore, as shown in FIG. 3 and FIG. 4, the reinforcement portions 28 each have, as viewed in cross section from the vehicle width direction (the vehicle body side), a front face 28A that slopes in the vehicle body forward direction heading in the vehicle body upward direction and a rear face 28B that slopes in the vehicle body rearward direction heading in the vehicle body upward direction. That is, the reinforcement portions 28 are each formed substantially in the shape of an isosceles trapezoid as viewed in cross section from the vehicle width direction. Additionally, the reinforcement portions 28 are each formed hollow having a substantially isosceles trapezoid-shaped through hole 28C running in the vehicle width direction through the reinforcement portion 28.

Furthermore, fastening holes 22A and fastening holes 28D (see FIG. 6) for fastening the bottom plate member 14 to a right and left pair of rockers 30 (see FIG. 6) serving as a vehicle body are formed in the flat plate portions 22 and the reinforcement portions 28 on the vehicle width direction outer sides of the side plate members 16 and on extension lines of the partition portions 26 extended outward the vehicle width direction as shown in FIG. 1 and FIG. 2.

Additionally, as shown in FIG. 6, open cylinder-shaped collar members 38 are inserted from the vehicle width direction outer sides into and are provided in the through holes 28C in the reinforcement portions 28 in such a way that the axial direction of the collar members 38 coincides with the upward and downward direction, and through holes 38A in the collar members 38 are communicated with the fastening holes 22A and the fastening holes 28D.

As shown in FIG. 6, the right and left pair of rockers 30 are each formed in a closed cross-sectional shape as a result of an outer panel 32 and an inner panel 34—each formed substantially in a cross-sectional hat shape—being joined to each other at mutual upper flange portions 32A and 34A and at mutual lower flange portions 32B and 34B. Additionally, in a lower wall 34D of each of the right and left inner panels 34, plural through holes 34C are formed a predetermined interval apart from each other in the longitudinal direction of the rockers 30, and plural weld nuts 42 are provided, coaxially with the through holes 34C, on the inner surfaces of the lower walls 34D.

Consequently, the bottom plate member 14 is fastened to the lower wall 34D sides of the right and left pair of rockers 30 as a result of bolts 44 being inserted from below into the fastening holes 28D in the reinforcement portions 28, the through holes 38A in the collar members 38, the fastening holes 22A in the flat plate portions 22, and the through holes 34C in the rockers 30 and screwed into the weld nuts 42. The battery case 12 into which the plural battery packs 50 have been put is attached to the vehicle body as a result of the bolts 44 being screwed into the weld nuts 42.

Furthermore, as shown in FIG. 6, a substantially flat plate-shaped floor panel 40 bridges upper walls 34U of the right and left inner panels 34. The vehicle width direction outer end portions of the floor panel 40 are joined to the upper walls 34U of the inner panels 34 of the rockers 30. Because of this, the battery case 12 into which the plural battery packs 50 have been put is disposed between side walls 34S (vehicle width direction inner sides) of the right and left rockers 30 and on the lower side of the floor panel 40.

Next, the action of the vehicle battery-carrying floor structure 10 pertaining to the embodiment having the above configuration will be described.

As described above, the unit members 20 are formed by extrusion. Consequently, the strength and rigidity (particularly strength and rigidity with respect to loads input from the vehicle width direction outer sides) of even the unit members 20 having the partition portions 26 integrally disposed upright on the upper surfaces of the flat plate portions 22 can be ensured. Because of this, the strength and rigidity of the bottom plate member 14 that is configured as a result of the plural unit members 20 being coupled to each other are also ensured.

Furthermore, in the vehicle battery-carrying floor structure 10 pertaining to the embodiment, changes in the quantity of the battery packs 50 to be carried can be flexibly accommodated. The quantity of the unit members 20 to be coupled to each other is decided, and the size of the bottom plate member 14 (the battery case 12) is decided, in accordance with the quantity of the battery packs 50 to be carried.

For example, in the case of carrying eight battery packs 50 as shown in FIG. 2, three unit members 20 are disposed between the unit member 20F that configures the front end portion and the unit member 20R that configures the rear end portion, and eight regions E are formed by five partition portions 26, two side plate members 16, and four intermediate plate members 18.

Figure 7:
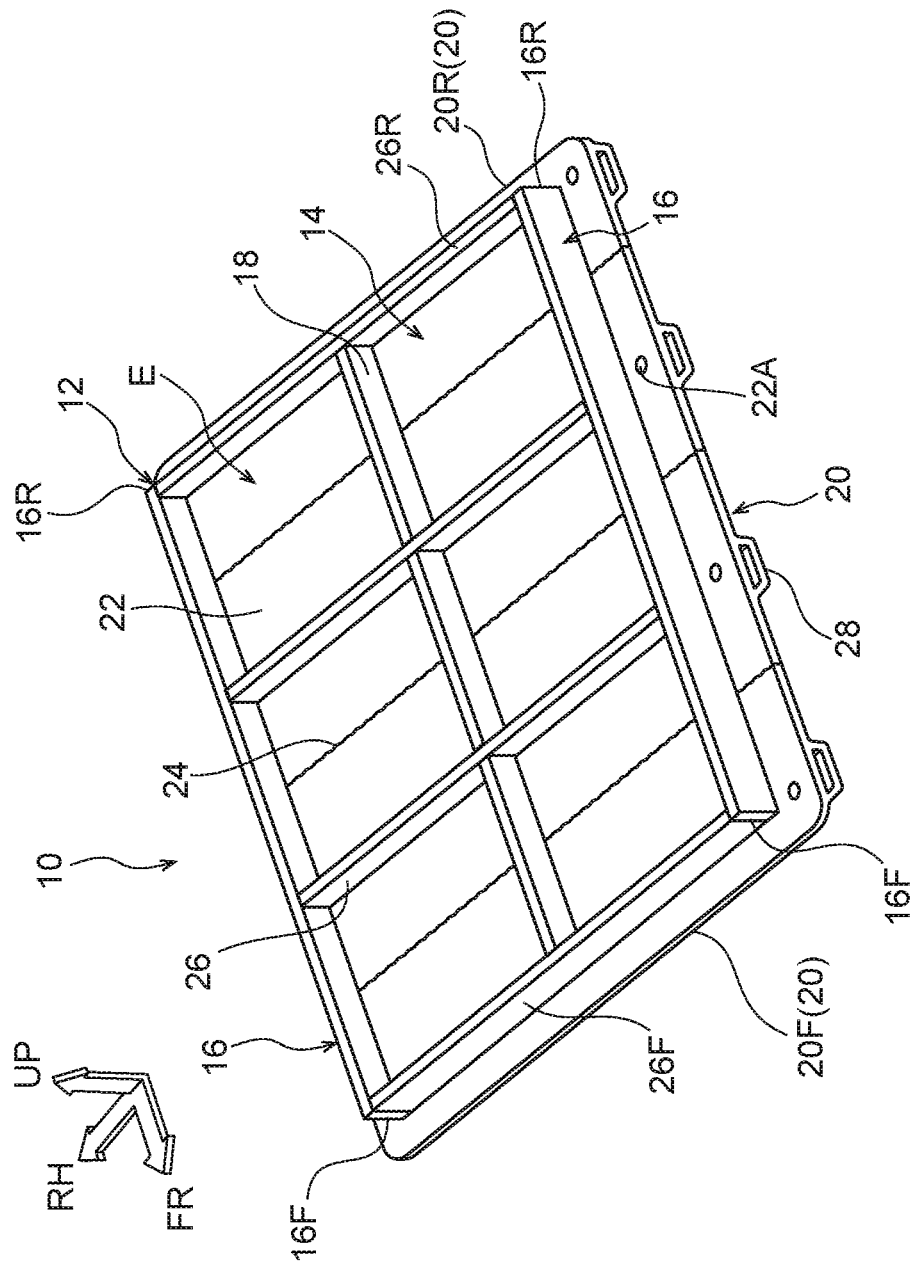
FIG. 7 is a perspective view showing a first example modification of the vehicle battery-carrying floor structure pertaining to the embodiment.

Furthermore, in the case of carrying six battery packs 50, as shown in FIG. 7, two unit members 20 are disposed between the unit member 20F that configures the front end portion and the unit member 20R that configures the rear end portion, and six regions E are formed by four partition portions 26, two side plate members 16, and three intermediate plate members 18.

Figure 8:
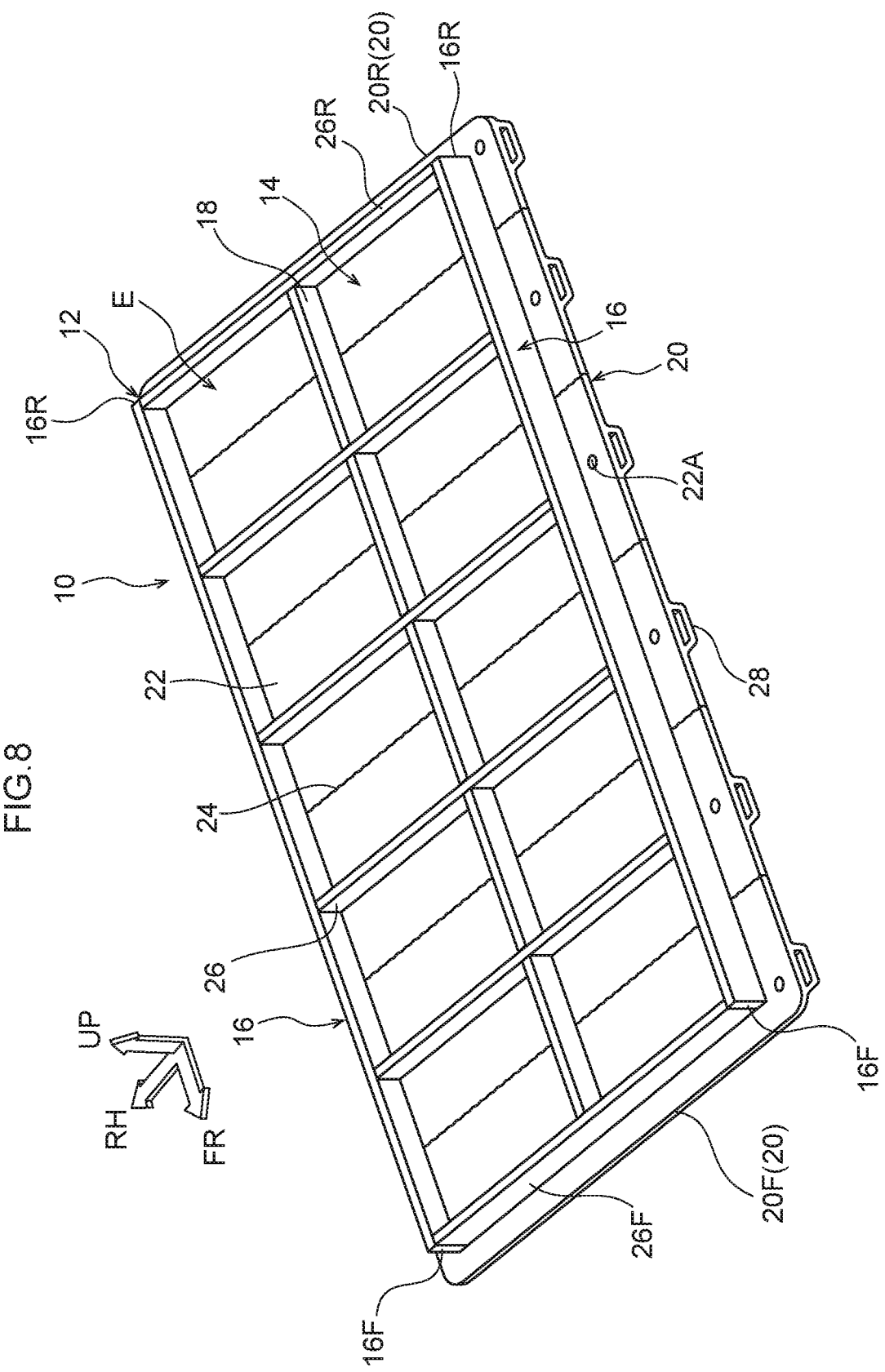
FIG. 8 is a perspective view showing a second example modification of the vehicle battery-carrying floor structure pertaining to the embodiment.

Moreover, in the case of carrying ten battery packs 50, as shown in FIG. 8, four unit members 20 are disposed between the unit member 20F that configures the front end portion and the unit member 20R that configures the rear end portion, and ten regions E are formed by six partition portions 26, two side plate members 16, and five intermediate plate members 18.

In this way, by changing the quantity of the unit members 20, the size of the bottom plate member 14 can be changed. The size of the battery case 12 can be changed in accordance with the quantity of the battery packs 50 to be carried. Consequently, flexibility with respect to the battery pack 50 carrying capacity of the battery case 12 can be increased.

It will be noted that, as described above, at least the lower surface sides of the joint portions 24 are joined by friction stir welding (FSW). Consequently, even when the battery case 12 into which the plural battery packs 50 have been put is disposed between the side walls 34S (the vehicle width direction inner sides) of the right and left rockers 30 and on the lower side of the floor panel 40, muddy water and/or rain water, for example, can be inhibited or prevented from getting inside at least from the lower surfaces of the joint portions 24.

Furthermore, when the joint portions 24 are joined to each other by friction stir welding (FSW) and not arc welding or the like, the bottom plate member 14 whose dimensional precision is high can be manufactured. That is, with friction stir welding, there is little strain and/or residual stress because the joint portions 24 can be joined at a lower temperature than the melting point of the unit members 20 (the light metal material such as an aluminum alloy). Consequently, it becomes difficult for warping and twisting to occur in the bottom plate member 14 after the joining, and the dimension precision of the bottom plate member 14 is ensured.

Furthermore, the right and left pair of side plate members 16 are joined to the upper surfaces of the flat plate portions 22 on the vehicle width direction outer sides of the partition portions 26, and the plural intermediate plate members 18 that extend in the vehicle body forward and rearward direction are joined to the upper surfaces, at the vehicle width direction center portions, of the flat plate portions 22. In other words, the side plate members 16 and the intermediate plate members 18 are joined to the bottom plate member 14 that is high in strength and rigidity. Consequently, the occurrence of warping and twisting in the battery case 12 can be inhibited or prevented, and the product precision of the battery case 12 can be ensured.

Figure 9:
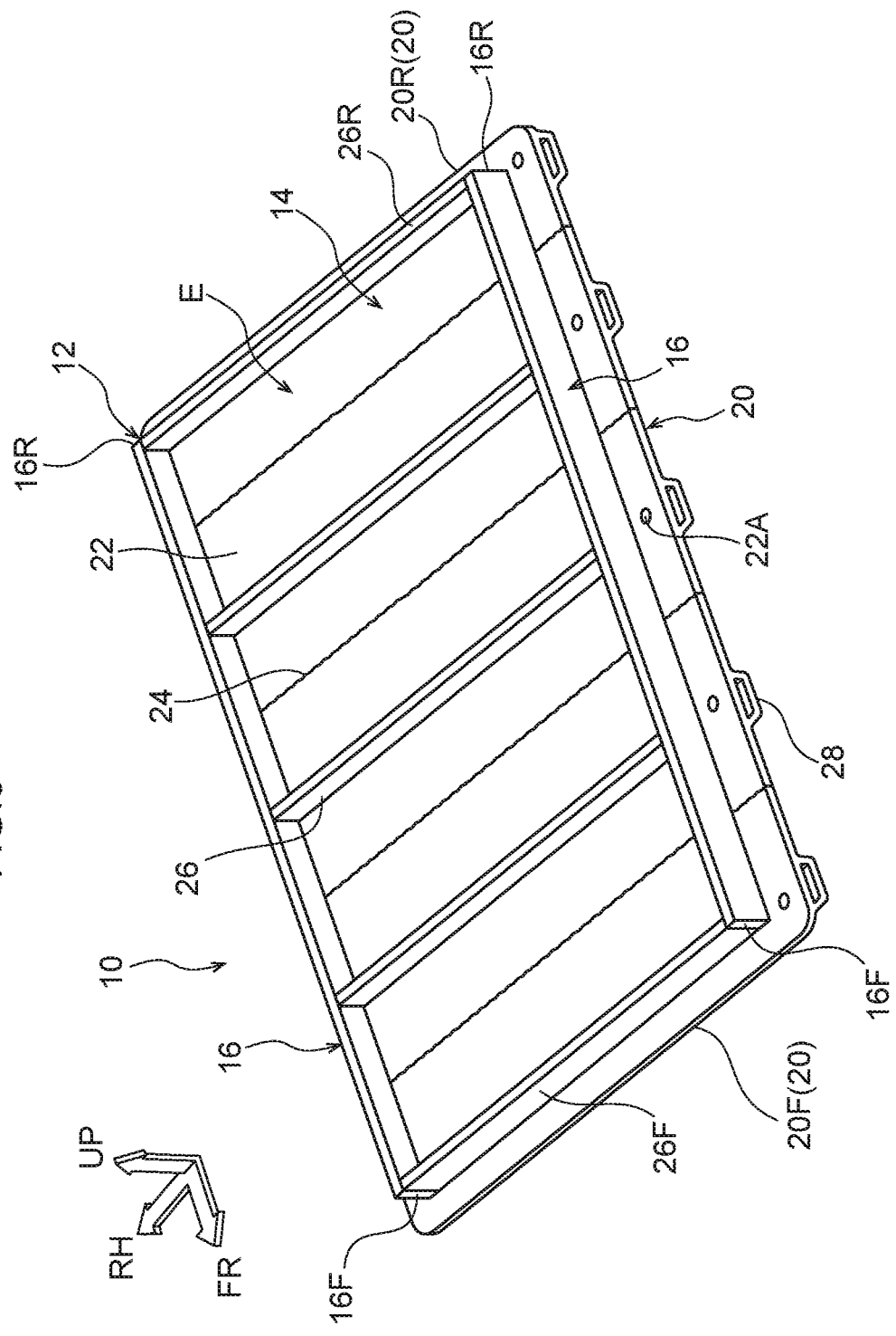
FIG. 9 is a perspective view showing a third example modification of the vehicle battery-carrying floor structure pertaining to the embodiment.

Furthermore, the battery case 12 is configured by simply joining the side plate members 16 and the intermediate plate members 18 to the bottom plate member 14, so the structure of the battery case 12 is simple. It will be noted that in a case where the battery packs 50 each have a rectangular shape that is long in the vehicle width direction as shown in FIG. 9, the battery case 12 may be configured to not have the intermediate plate members 18. In this way, according to the vehicle battery-carrying floor structure 10 pertaining to the embodiment, changes in the vehicle width direction length of the battery packs 50 can be flexibly accommodated, and the vehicle battery-carrying floor structure 10 can hold the battery packs 50.

Furthermore, the reinforcement portions 28 are formed on the lower surfaces of the flat plate portions 22 on the opposite sides of the partition portions 26. Consequently, the strength and rigidity of the parts where the partition portions 26 are formed can be enhanced by the reinforcement portions 28. Furthermore, the reinforcement portions 28 each have, as viewed in cross section from the vehicle width direction, the front face 28A that slopes in the vehicle body forward direction heading in the vehicle body upward direction and the rear face 28B that slopes in the vehicle body rearward direction heading in the vehicle body upward direction.

Consequently, even if rocks and the like on road surfaces hit the front faces 28A or the rear faces 28B of the reinforcement portions 28 while the vehicle is traveling (including not only forward travel but also backward travel), the rocks and the like do not catch on the reinforcement portions 28. Even if rocks and the like hit the front faces 28A or the rear faces 28B of the reinforcement portions 28, the reinforcement portions 28 can simply go over the rocks and the like. Thus, damage to the reinforcement portions 28 can be inhibited or prevented.

Figure 10:
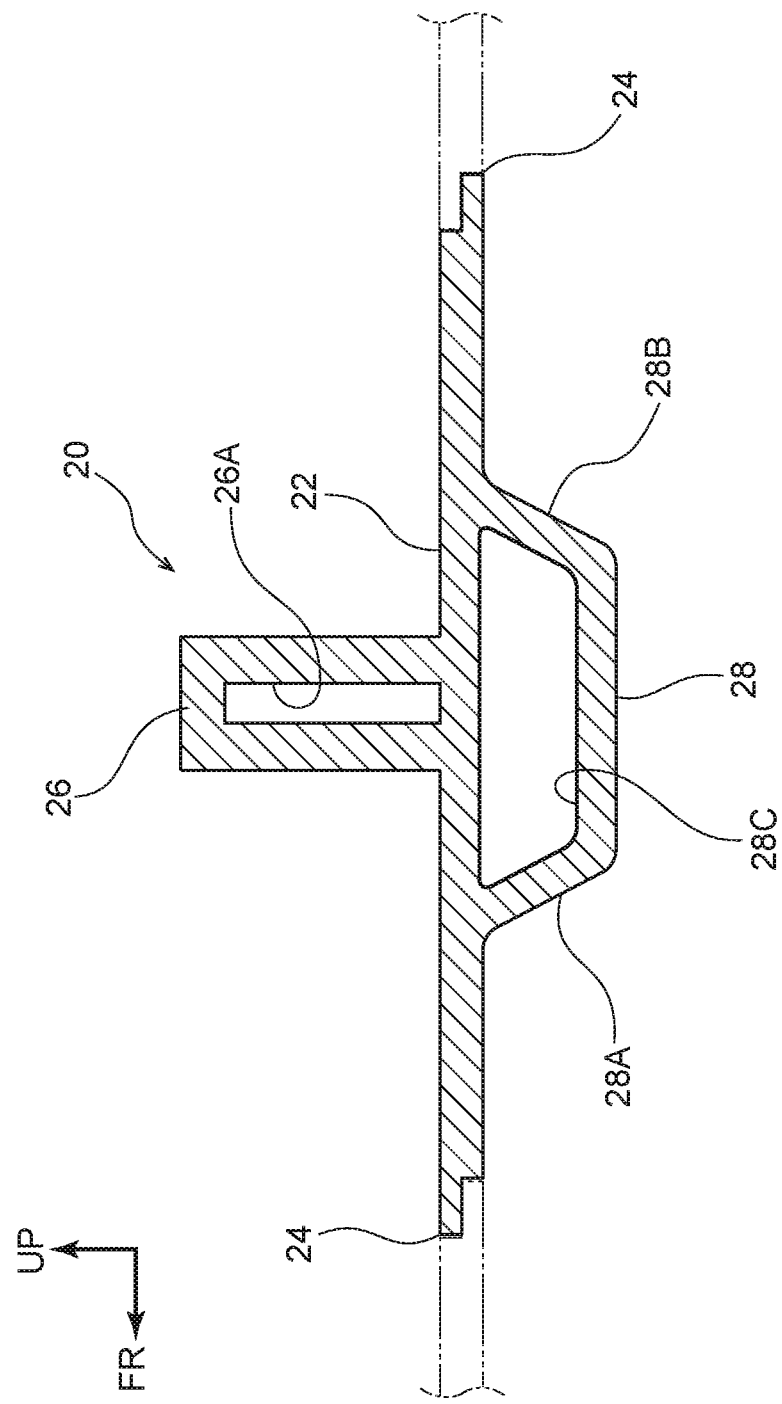
FIG. 10 is a sectional view, corresponding to FIG. 3, showing an example modification of a partition portion of the unit members of the vehicle battery-carrying floor structure pertaining to the embodiment.

Furthermore, the reinforcement portions 28 are formed hollow. Consequently, the bottom plate member 14 (the battery case 12) can be made lighter in weight compared to a case where the reinforcement portions 28 are formed solid. It will be noted that not only the reinforcement portions 28 but also the partition portions 26 may be formed hollow as shown in FIG. 10 for example.

That is, in a case where the plate thickness of the partition portions 26 is formed thicker than the plate thickness of the partition portions 26 shown in FIG. 3 and FIG. 4 to further enhance the strength of the unit members 20, rectangular through holes 26A running in the vehicle width direction through the partition portions 26 may also be formed in the partition portions 26. According to this, even when the plate thickness of the partition portions 26 is thick, an increase in the weight of the unit members 20 can be inhibited or prevented (the bottom plate member 14 can be made lighter in weight) compared to a case where the partition portions 26 are formed solid.

Furthermore, as shown in FIG. 6, the battery case 12 is attached to the vehicle body as a result of the vehicle width direction outer end portions of the bottom plate member 14 being fastened by the bolts 44 and the weld nuts 42 to the lower wall 34D sides of the rockers 30. That is, the fastening holes 22A and the fastening holes 28D in the bottom plate member 14 are formed in the flat plate portions 22 and the reinforcement portions 28 on the vehicle width direction outer sides of the side plate members 16 and on extension lines of the partition portions 26 extended outward the vehicle width direction.

Here, the flat plate portions 22 on the extension lines of the partition portions 26 extended outward the vehicle width direction are increased in strength and rigidity because of the reinforcement portions 28. Consequently, the battery case 12 can be attached with good precision to the vehicle body (the rockers 30). It will be noted that the battery case 12 that configures the vehicle battery-carrying floor structure 10 pertaining to the embodiment is not limited to a configuration where it is disposed on the lower side of the floor panel 40.

Figure 11:
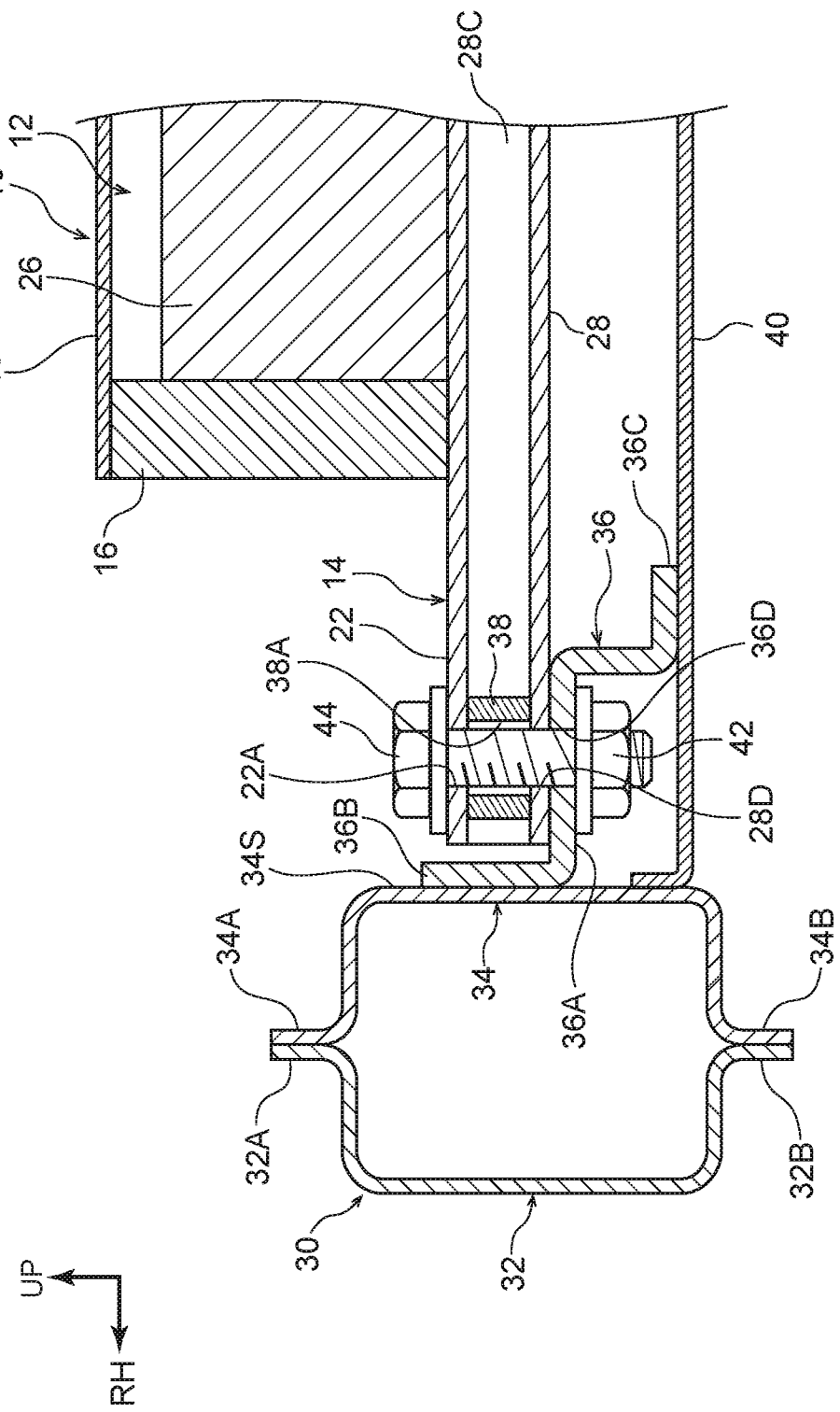
FIG. 11 is a front sectional view showing a state in which the vehicle battery-carrying floor structure pertaining to the embodiment is disposed on the upper side of the floor panel.

In a case where the floor panel 40 bridges the lower portion sides of the side walls 34S of the right and left inner panels 34 as shown in FIG. 11 for example, the battery case 12 may be disposed on the upper side of the floor panel 40 using brackets 36 that are each formed stepwise as viewed from the vehicle body forward and rearward direction and extend in the vehicle body forward and rearward direction (the longitudinal direction of the rockers 30).

Figure 12A:
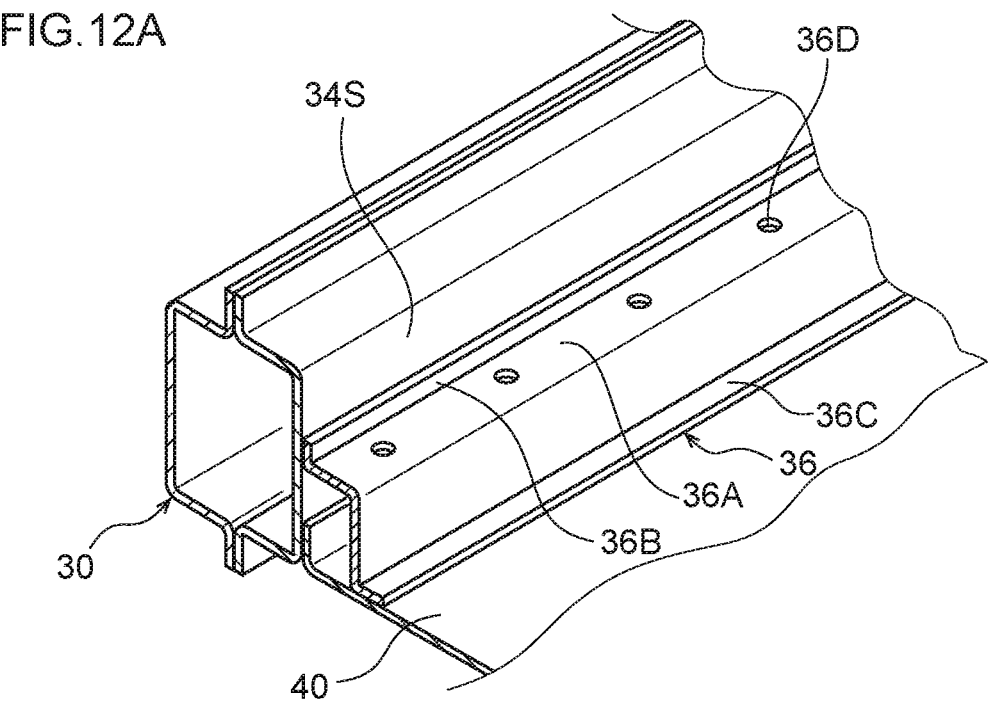
FIG. 12A is a perspective view showing a bracket for disposing, on the upper side of the floor panel, the vehicle battery-carrying floor structure pertaining to the embodiment.

Specifically, as shown in FIG. 11 and FIG. 12A, as viewed from the vehicle body forward and rearward direction, the brackets 36 each have a main body portion 36A that is disposed horizontally, one end portion 36B that is bent in the vehicle body upward direction from the vehicle width direction outer end portion of the main body portion 36A, and another end portion 36C that is bent substantially in a cross-sectional L-shape in the vehicle body downward direction from the vehicle width direction inner end portion of the main body portion 36A.

Furthermore, in the main body portion 36A of each bracket 36, plural through holes 36D are formed a predetermined interval apart from each other so as to correspond to the plural fastening holes 28D and fastening holes 22A, and plural weld nuts 42 are provided, coaxially with the through holes 36D, on the lower surface of each main body portion 36A. Additionally, the one end portions 36B of the brackets 36 are joined to the side walls 34S of the right and left inner panels 34, and the other end portions 36C of the brackets 36 are joined to the upper surface of the floor panel 40.

In this configuration, the reinforcement portions 28 are disposed on the upper surfaces of the main body portions 36A of the brackets 36, and the bolts 44 are inserted from above into the fastening holes 22A in the flat plate portions 22, the through holes 38A in the collar members 38, the fastening holes 28D in the reinforcement portions 28, and the through holes 36D in the brackets 36 and are screwed into the weld nuts 42, whereby the bottom plate member 14 is attached to the brackets 36.

In other words, the battery case 12 that configures the vehicle battery-carrying floor structure 10 pertaining to the embodiment is disposed between the side walls 34S (the vehicle width direction inner sides) of the right and left rockers 30 and on the upper side of the floor panel 40. It will be noted that each of the brackets 36 may also be segmented into plural brackets in the vehicle body forward and rearward direction as shown in FIG. 12B for example.

Figure 12B:
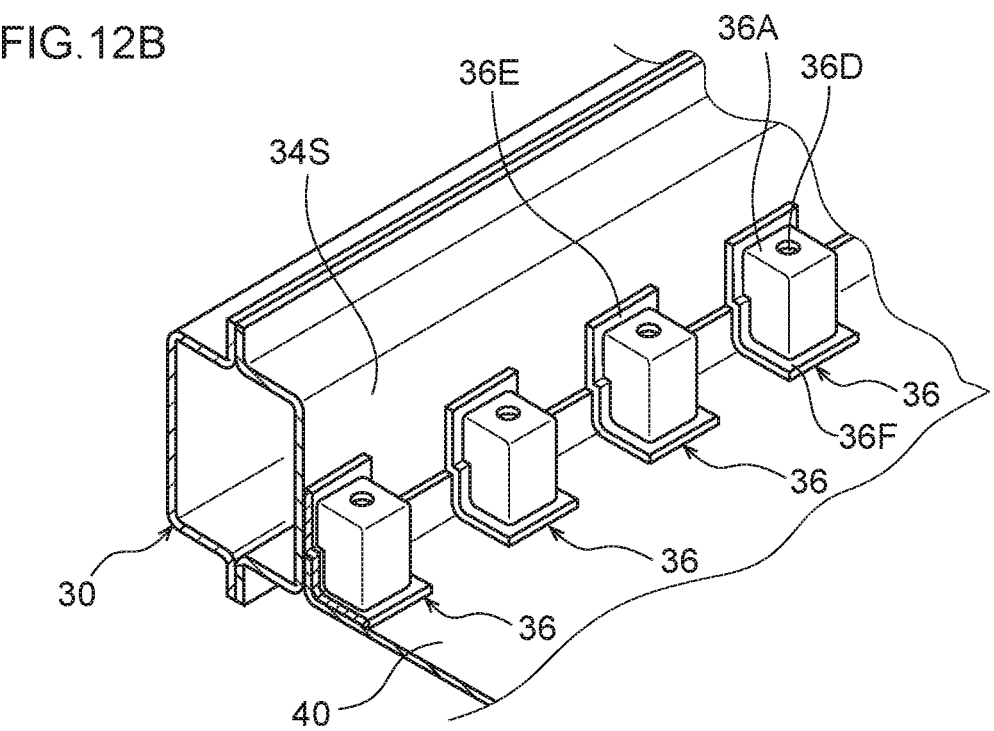
FIG. 12B is a perspective view showing other brackets for disposing, on the upper side of the floor panel, the vehicle battery-carrying floor structure pertaining to the embodiment.

Specifically, as shown in FIG. 12B, each of the segmented brackets 36 is formed as an enclosure whose vehicle width direction outer side and vehicle body lower side are open, with the upper wall thereof being the main body portion 36A having the through hole 36D. Additionally, the weld nuts 42 (see FIG. 11) are provided, coaxially with the through holes 36D, on the lower surfaces of the main body portions 36A of the brackets 36.

Furthermore, flange portions 36E that stick out in the vehicle body upward direction, the vehicle body forward direction, and the vehicle body rearward direction are integrally formed on the vehicle width direction outer peripheral edge portions of the brackets 36, and flange portions 36F that stick out inward in the vehicle width direction, the vehicle body forward direction, and the vehicle body rearward direction are integrally formed on the vehicle body lower peripheral edge portions of the brackets 36.

Additionally, the brackets 36 are disposed a predetermined interval apart from each other in such a way that the through holes 36D correspond to the plural fastening holes 28D and fastening holes 22A, the flange portions 36E are joined to the side walls 34S of the right and left inner panels 34, and the flange portions 36F are joined to the upper surface of the floor panel 40.

In this configuration, the reinforcement portions 28 are disposed on the upper surfaces of the main body portions 36A of the brackets 36, and the bolts 44 are inserted from above into the fastening holes 22A in the flat plate portions 22, the through holes 38A in the collar members 38, the fastening holes 28D in the reinforcement portions 28, and the through holes 36D in the brackets 36 and are screwed into the weld nuts 42, whereby the bottom plate member 14 is attached to the brackets 36.

Figure 13:
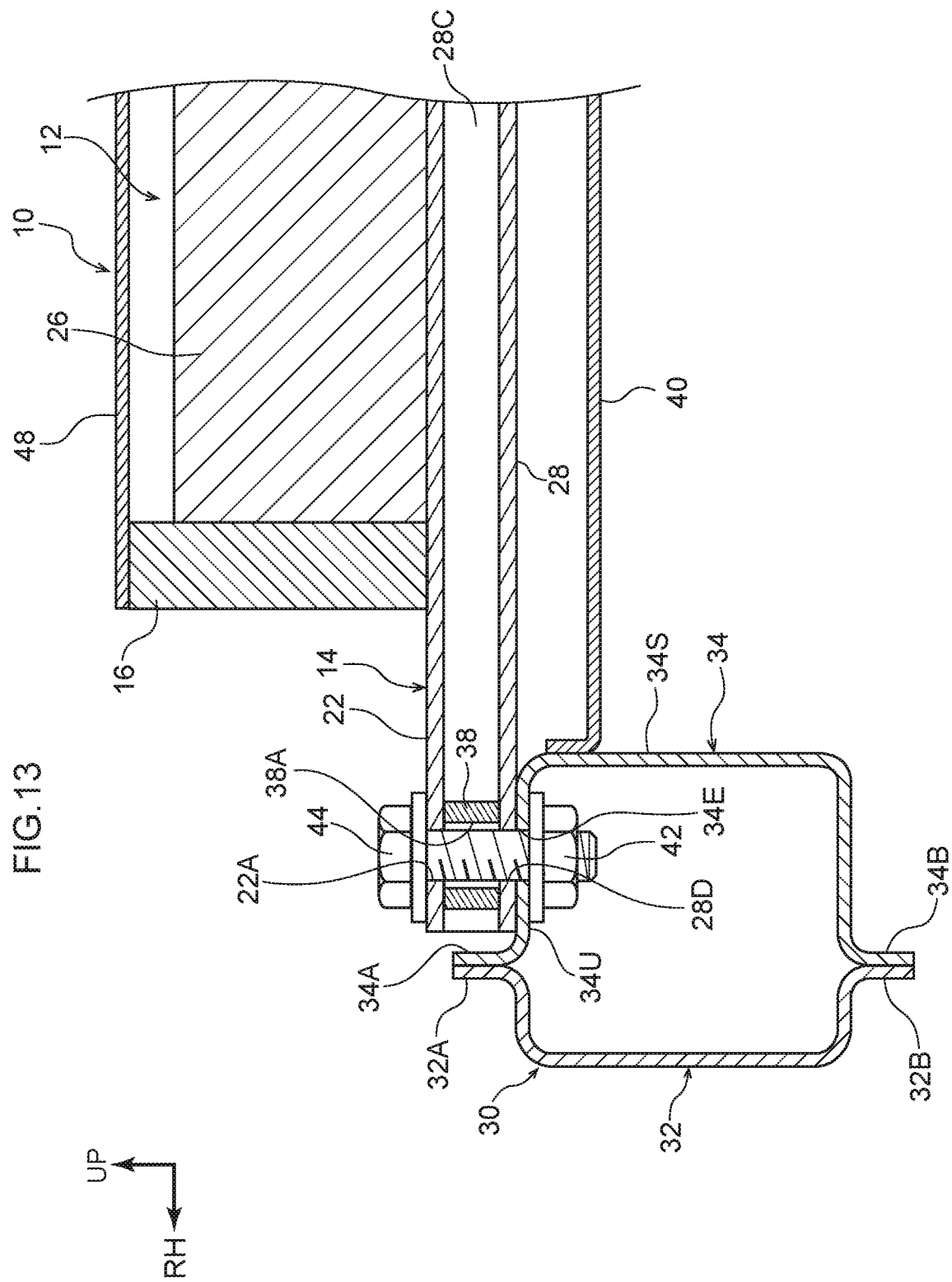
FIG. 13 is a front sectional view showing another state in which the vehicle battery-carrying floor structure pertaining to the embodiment is disposed on the upper side of the floor panel.

Furthermore, as shown in FIG. 13 for example, in a case where the floor panel 40 bridges the upper portion sides of the side walls 34S of the right and left inner panels 34, plural through holes 34E may be formed a predetermined interval apart from each other in the upper walls 34U of the inner panels 34 so as to correspond to the plural fastening holes 28D and fastening holes 22A, and plural weld nuts 42 may be provided, coaxially with the through holes 34E, on the lower surfaces of the upper walls 34E.

In this configuration, the bolts 44 are inserted from above into the fastening holes 22A in the flat plate portions 22, the through holes 38A in the collar members 38, the fastening holes 28D in the reinforcement portions 28, and the through holes 34E in the inner panels 34 and are screwed into the weld nuts 42, whereby the bottom plate member 14 is attached to the upper wall 34U sides of the rockers 30. In other words, the battery case 12 that configures the vehicle battery-carrying floor structure 10 pertaining to the embodiment is disposed on the upper side of the right and left rockers 30 and the floor panel 40.

The vehicle battery-carrying floor structure 10 pertaining to the embodiment has been described above on the basis of the drawings, but the vehicle battery-carrying floor structure 10 pertaining to the embodiment is not limited to what is shown in the drawings and its design can be appropriately changed in a range that does not depart from the spirit of the disclosure. For example, the joint portion 24 on the vehicle body front side and the joint portion on the vehicle body rear side of each unit member 20 may also have the same shape.

In other words, the joint portions 24 of one unit member 20 may be formed in such a way that their upper portion sides (upper halves) stick out, the joint portions 24 of another unit member 20 may be formed in such a way that their lower portion sides (lower halves) stick out, and the one unit member 20 and the other unit member 20 may be alternately joined to each other.

However, in this configuration, both the one unit member 20 and the other unit member 20 must be extruded, and two molds become necessary. In contrast, when the joint portion 24 on the vehicle body front side and the joint portion 24 on the vehicle body rear side of each unit member 20 are formed vertically symmetrical as they are in the unit members 20 pertaining to the above embodiment, one mold suffices, so manufacturing costs can be reduced compared to a case where two molds become necessary.

Furthermore, in a case where the plate thickness of the side plate members 16 and/or the intermediate plate members 18 is formed thick as in the partition portions 26 shown in FIG. 10 to further enhance the strength of the battery case 12, the side plate members 16 and/or the intermediate plate members 18 may also be formed hollow. According to this, even when the plate thickness of the side plate members 16 and/or the intermediate plate members 18 is thick, an increase in the weight of the battery case 12 can be inhibited or prevented (the battery case 12 can be made lighter in weight) compared to a case where the side plate members 16 and/or the intermediate plate members 18 are formed solid.

An object of the present disclosure is to obtain a vehicle battery-carrying floor structure that has greater flexibility with respect to the battery pack carrying capacity.

A first aspect is a vehicle battery-carrying floor structure that includes: a bottom plate member that has a plurality of unit members that are arranged in a vehicle body forward and rearward direction and that are joined by joining opposing joint portions, each unit member having a flat plate portion that extends in a vehicle width direction and that has the joint portions formed at an end portion facing the vehicle body forward direction and at an end portion facing the vehicle body rear direction and a partition portion that is disposed upright so as to extend in the vehicle width direction on an upper surface of the plate portion; and side plate members that are provided on an upper surface of the bottom plate member on outer sides in the vehicle width direction of the partition portions and form, with the partition portions, regions that hold battery packs.

According to the first aspect, the bottom plate member having the regions that hold the battery packs is configured as a result of the plural unit members being arranged side by side in the vehicle body forward and rearward direction and having their mutually opposing joint portions joined to each other. In other words, the size of the bottom plate member can be changed by changing the quantity of the unit members in accordance with the quantity of the battery packs to be carried. Consequently, there is greater flexibility with respect to the battery pack carrying capacity.

A second aspect is the vehicle battery-carrying floor structure of the first aspect, wherein reinforcement portions are formed on lower surfaces of the flat plate portions on opposite sides from the partition portions.

According to the second aspect, the reinforcement portions are formed on the lower surfaces of the flat plate portions on the opposite sides of the partition portions. Consequently, the strength and rigidity of the parts where the partition portions are formed are enhanced by the reinforcement portions.

A third aspect is the vehicle battery-carrying floor structure of the second aspect, wherein the reinforcement portions each have, as viewed in cross section from the vehicle width direction, a front face that slopes in the vehicle body forward direction heading in a vehicle body upward direction and a rear face that slopes in the vehicle body rearward direction heading in the vehicle body upward direction.

According to the third aspect, the reinforcement portions each have, as viewed in cross section from the vehicle width direction, the front face that slopes in the vehicle body forward direction heading in the vehicle body upward direction and the rear face that slopes in the vehicle body rearward direction heading in the vehicle body upward direction. Consequently, even if rocks and the like on road surfaces hit the front faces or the rear faces of the reinforcement portions while the vehicle is traveling (including not only forward travel but also backward travel), the rocks and the like do not catch on the reinforcement portions. Even if rocks and the like hit the front faces or the rear faces of the reinforcement portions, the reinforcement portions can simply go over the rocks and the like. Thus, damage to the reinforcement portions is inhibited or prevented.

A fourth aspect is the vehicle battery-carrying floor structure of the second aspect or the third aspect, wherein the reinforcement portions are hollow.

According to the fourth aspect, the reinforcement portions are formed hollow. Consequently, the bottom plate member can be made lighter in weight compared to a case where the reinforcement portions are formed solid.

A fifth aspect is the vehicle battery-carrying floor structure of any one of the second aspect to the fourth aspect, wherein fastening holes that fasten the bottom plate member to the vehicle body are formed in the flat plate portions and the reinforcement portions on outer sides in the vehicle width direction of the side plate members and on extension lines of the partition portions extended outward in the vehicle width direction.

According to the fifth aspect, the fastening holes for fastening the bottom plate member to the vehicle body are formed in the flat plate portions and the reinforcement portions on the vehicle width direction outer sides of the side plate members and on extension lines of the partition portions extended outward the vehicle width direction. Here, the flat plate portions on the extension lines of the partition portions extended outward the vehicle width direction are high in strength and rigidity because of the reinforcement portions. Consequently, the bottom plate member is attached with good precision to the vehicle body.

A sixth aspect is the vehicle battery-carrying floor structure of any one of the first aspect to the fifth aspect, wherein the partition portions are hollow.

According to the sixth aspect, the partition portions are formed hollow. Consequently, the bottom plate member can be made lighter in weight compared to a case where the partition portions are formed solid.

A seventh aspect is the vehicle battery-carrying floor structure of any one of the first aspect to the sixth aspect, wherein intermediate plate members that extend in the vehicle body forward and rearward direction are provided on the upper surfaces, at center portions in the vehicle width direction, of the flat plate portions.

According to the seventh aspect, the intermediate plate members that extend in the vehicle body forward and rearward direction are provided on the upper surfaces, at the vehicle width direction center portions, of the flat plate portions. In other words, the battery packs are put in the regions formed by the side plate members, the partition portions, and the intermediate plate members. Consequently, even if there are changes in the vehicle width direction length of the battery packs, the vehicle battery-carrying floor structure can hold the battery packs.

An eighth aspect is the vehicle battery-carrying floor structure of any one of the first aspect to the seventh aspect, wherein at least lower surface sides of the joint portions are friction stir welded.

According to the eighth aspect, at least the lower surface sides of the joint portions are friction stir welded. Consequently, the ingress of muddy water and/or rain water, for example, through the joint portions is inhibited or prevented.

According to the first aspect, flexibility with respect to the battery pack carrying capacity can be increased.

According to the second aspect, the strength and rigidity of the parts where the partition portions are formed can be enhanced.

According to the third aspect, damage to the reinforcement portions can be inhibited or prevented.

According to the fourth or sixth aspect, the bottom plate member can be made lighter in weight.

According to the fifth aspect, the bottom plate member can be attached with good precision to the vehicle body.

According to the seventh aspect, even changes in the vehicle width direction length of the battery packs can be accommodated.

According to the eighth aspect, the ingress of muddy water and/or rain water, for example, through the joint portions can be inhibited or prevented.

What is claimed is:

1. A vehicle battery-carrying floor structure comprising:
   a bottom plate member that has a plurality of unit members that are arranged in a vehicle body forward and rearward direction and that are joined by joining opposing joint portions, each unit member having a flat plate portion that extends in a vehicle width direction and that has the joint portions formed at an end portion facing the vehicle body forward direction and at an end portion facing the vehicle body rear direction and a partition portion that is disposed upright so as to extend in the vehicle width direction on an upper surface of the plate portion; and
   side plate members that are provided on an upper surface of the bottom plate member on outer sides in the vehicle width direction of the partition portions and form, with the partition portions, regions that hold battery packs, and
   wherein reinforcement portions are formed on lower surfaces of the flat plate portions on opposite sides from the partition portions.

2. The vehicle battery-carrying floor structure according to claim 1, wherein the reinforcement portions are formed at positions that correspond to the partition portions on the lower surfaces of the flat plate portions on the opposite sides from the partition portions.

3. The vehicle battery-carrying floor structure according to claim 1, wherein the reinforcement portions each have, as viewed in cross section from the vehicle width direction, a front face that slopes in the vehicle body forward direction heading in a vehicle body upward direction and a rear face that slopes in the vehicle body rearward direction heading in the vehicle body upward direction.

4. The vehicle battery-carrying floor structure according to claim 1, wherein the reinforcement portions are hollow.

5. The vehicle battery-carrying floor structure according to claim 1, wherein fastening holes that fasten the bottom plate member to a vehicle body are formed in the flat plate portions and the reinforcement portions on outer sides in the vehicle width direction of the side plate members and on extension lines of the partition portions extended outward in the vehicle width direction.

6. The vehicle battery-carrying floor structure according to claim 1, wherein the partition portions are hollow.

7. The vehicle battery-carrying floor structure according to claim 1, wherein intermediate plate members that extend in the vehicle body forward and rearward direction are provided on the upper surfaces, at center portions in the vehicle width direction, of the flat plate portions.

8. The vehicle battery-carrying floor structure according to claim 7, wherein each of at least one of the side plate members or the intermediate plate members is hollow.

9. The vehicle battery-carrying floor structure according to claim 1, wherein at least lower surface sides of the joint portions are friction stir welded.

10. The vehicle battery-carrying floor structure according to claim 1, wherein the joint portions are formed stepwise.

* * * * *